United States Patent [19]

Marshall

[11] Patent Number: 5,479,971
[45] Date of Patent: Jan. 2, 1996

[54] DUAL ACTION TREE CUTTING APPARATUS

[76] Inventor: Lorry L. Marshall, P.O. Box 51, Sargent, Nebr. 68874

[21] Appl. No.: 283,583

[22] Filed: Aug. 1, 1994

[51] Int. Cl.[6] .................................................. A01G 23/08
[52] U.S. Cl. ........................ 144/34 R; 30/379.5; 83/491; 83/928; 83/597; 56/233; 56/255; 144/3 D; 144/336; 144/218
[58] Field of Search ........................... 56/10.1, 233, 235, 56/249, 255, 266; 30/379, 379.5; 83/491, 597, 835, 928; 144/3 D, 34 R, 218, 336

[56] References Cited

U.S. PATENT DOCUMENTS

| | | | |
|---|---|---|---|
| 2,529,934 | 11/1950 | Gracey et al. | 144/34 R |
| 3,122,184 | 5/1961 | Larson | 144/34 R |
| 3,270,787 | 9/1966 | Rehnstrom | 144/34 R |
| 3,627,002 | 12/1971 | Fulghum, Jr. | 144/34 E |
| 3,852,881 | 12/1974 | Treace | 83/491 |
| 4,046,179 | 9/1977 | Crawford | 144/34 E |
| 4,081,007 | 3/1978 | Loigerot | 144/3 D |
| 4,681,145 | 7/1987 | York | 144/2 N |
| 4,690,185 | 9/1987 | Hamilton et al. | 144/34 R |
| 4,848,425 | 7/1989 | Mercier et al. | 144/34 R |
| 5,101,873 | 4/1992 | Marshall | 144/34 E |
| 5,144,993 | 9/1992 | Marshall | 144/34 R |

*Primary Examiner*—W. Donald Bray
*Attorney, Agent, or Firm*—Zarley, McKee, Thomte, Voorhees & Sease; Mark D. Frederiksen

[57] ABSTRACT

A dual action tree cutting apparatus includes a single generally planar blade mounted on a shaft at the forward end of a support frame, with the blade projecting forwardly therefrom. The blade has a cutting edge extending around the entire perimeter, and has two mirror image halves divided by a centerline passing through the shaft. Each blade half cutting edge increases in the distance between the cutting edge and the shaft along the perimeter from a rearward end of the centerline to a forward end of the centerline. A set of cutting teeth are formed on one blade half and oriented to cut a tree when the blade is rotated clockwise, while a second set of cutting teeth are oriented on the second blade half perimeter to cut a tree when the blade is rotated counterclockwise. A sprocket on the shaft is engaged by a pair of drive chains connected to operable cylinders, the cylinders operable to retract and pull one drive train to rotate the blade in each direction.

3 Claims, 3 Drawing Sheets

DUAL ACTION TREE CUTTING APPARATUS

TECHNICAL FIELD

The present invention relates generally to apparatus for cutting trees, and more particularly to an improved tree cutting apparatus with a slow moving cutting blade capable of cutting in two directions.

BACKGROUND OF THE INVENTION

Various apparatus for felling trees are well known. Examples include chain saws, rotary blades such as circular saws, and shear severing devices. Chain saws are subject to frequent failure because of the number of moving parts. Circular saws, while typically stronger and more robust, are also more bulky. In addition, both chain saws and circular saws run at high speeds, with the attendant hazard from flying chips and debris. Shear severing devices require enormous amounts of power and leverage to fell trees having a diameter of more than a mere few inches.

To overcome these deficiencies, the inventor devised a tree cutting apparatus which issued as U.S. Pat. No. 5,101,873. While the device of the '873 patent solved many problems, it required two blades acting simultaneously, with the accompanying mechanical structure for operating a pair of blades. The inventor herein then created a single blade tree cutting apparatus disclosed and claimed in U.S. Pat. No. 5,144,993 which improved upon the device of the '873 patent. However, the single blade apparatus was not completely efficient, since it was necessary for the blade to complete a full cycle before the apparatus could be utilized to cut another tree. The apparatus of the present invention requires only a single blade, yet permits immediate cutting capability without having to wait for the blade to return to a "start" position.

SUMMARY OF THE INVENTION

It is therefore a general object of the present invention to provide an improved dual action tree cutting apparatus.

Another object is to provide a tree cutting apparatus with a single slow moving blade operable in two directions.

A further object is to provide a tree cutting apparatus which eliminates flying chips and debris during the cutting operation.

Yet another object of the present invention is to provide a tree cutting apparatus which will cut large diameter trees with only minimal power requirements.

Still a further object is to provide an improved tree cutting apparatus which is simple in operation, economical to manufacture and light weight for connection to mobile vehicles.

These and other objects will be apparent to those skilled in the art.

The dual action tree cutting apparatus of the present invention includes a single generally planar blade mounted on a shaft at the forward end of a support frame, with the blade projecting forwardly therefrom. The blade has a cutting edge extending around the entire perimeter, and has two mirror image halves divided by a centerline passing through the shaft. Each blade half cutting edge increases in the distance between the cutting edge and the shaft along the perimeter from a rearward end of the centerline to a forward end of the centerline. A set of cutting teeth are formed on one blade half and oriented to cut a tree when the blade is rotated clockwise, while a second set of cutting teeth are oriented on the second blade half perimeter to cut a tree when the blade is rotated counterclockwise. A sprocket on the shaft is engaged by a pair of drive chains connected to operable cylinders, the cylinders operable to retract and pull one drive train to rotate the blade in each direction.

DESCRIPTION OF THE PREFERRED EMBODIMENT

Figure 1:
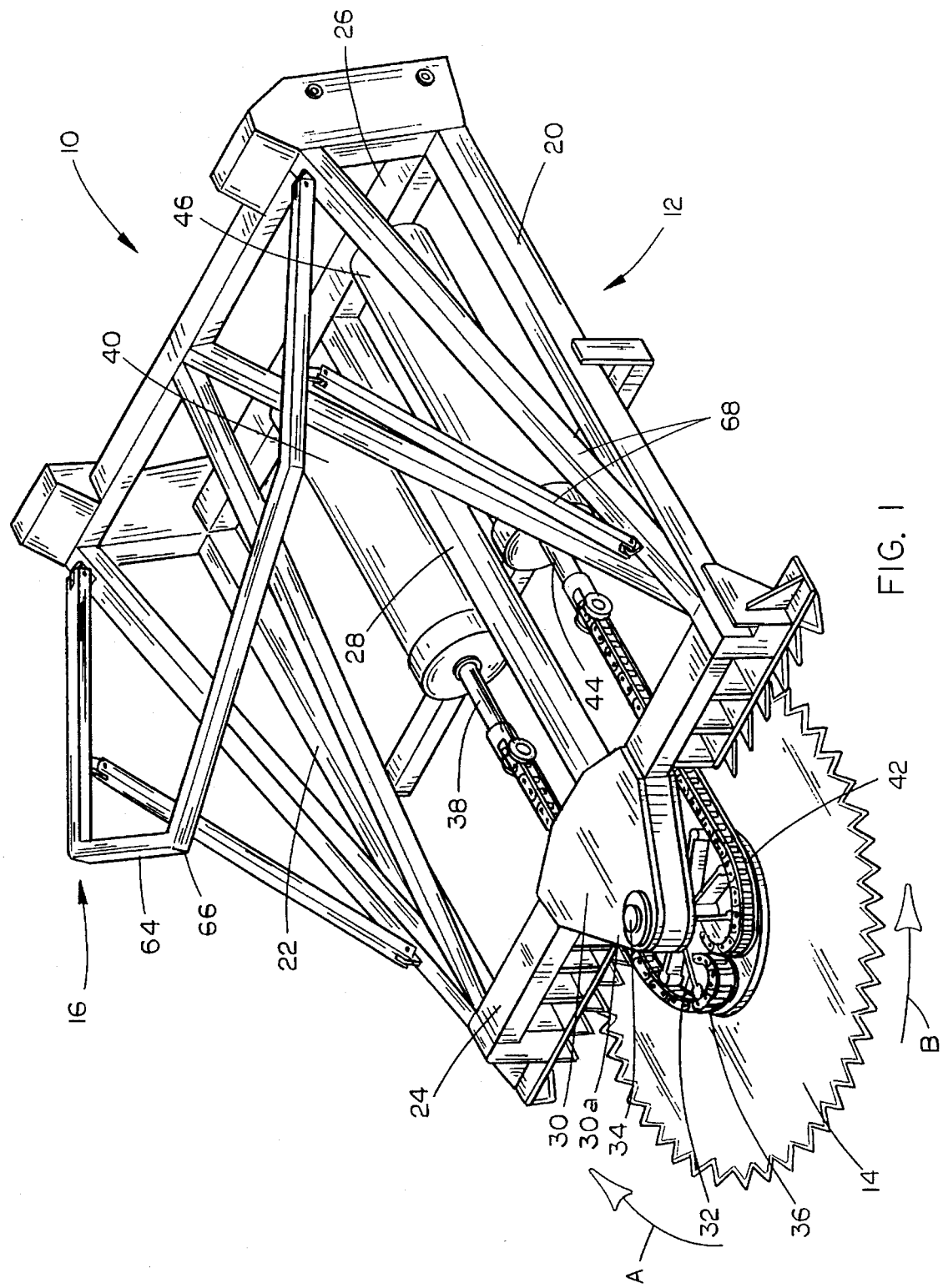
FIG. 1 is a perspective view of the tree cutting apparatus of the present invention.

Referring now to the drawings, in which identical or corresponding parts are identified with the same reference numeral, and more particularly to FIG. 1, the tree cutting apparatus of the present invention is designated generally at 10 and includes a frame 12 for supporting a rotatable blade 14, and a tree deflecting frame 16.

As shown in FIG. 1, frame 12 is formed of right and left elongated members 20 and 22, which are oriented in parallel, spaced apart relationship by a forward cross-member 24 and a rearward cross-member 26. A central elongated member 28, parallel to right and left elongated members 20 and 22, extends between cross-members 24 and 26.

A triangular-shaped bracket 30 is mounted to forward cross-member 24 and projects forwardly therefrom generally centrally on cross-member 24. A drive sprocket 32 is mounted coaxially on a shaft 34 which is rotatably mounted through the projecting forward apex 30a of bracket 30. Blade 14 is affixed to sprocket 34 for rotation therewith.

A first drive chain 36 has a forward end affixed to sprocket 32 for rotation therearound, with a rearward end extending rearwardly of forward cross-member 24 and connected to one end of a retractable arm 38. Retractable arm 38 is powered by cylinder 40 which is mounted on support frame 12, so as to retract, and thereby pull first drive chain 36 and rotate blade 14 about shaft 34 in a first direction identified by arrow A. A second drive chain 42 has a forward end affixed to sprocket 32 and extends therearound rearwardly to retractable arm 44 actuated by cylinder 46. Cylinder 46 thereby retracts arm 44 to pull drive chain 42 and rotate blade 14 on shaft 34 in a direction indicated by arrow B.

While a pair of drive chains are shown engaged with sprocket 32, and pulled by a pair of cylinders 40 and 46, various other apparatus for rotating blade 14 in opposing directions A and B are contemplated under this invention. For example, drive chains 36 and 42 could be connected together to form a single chain extending from retractable arm 38 to retractable arm 44. In addition, a motor may directly drive shaft 34, or shaft 34 may be rotated by other well known drive means.

Figure 3:
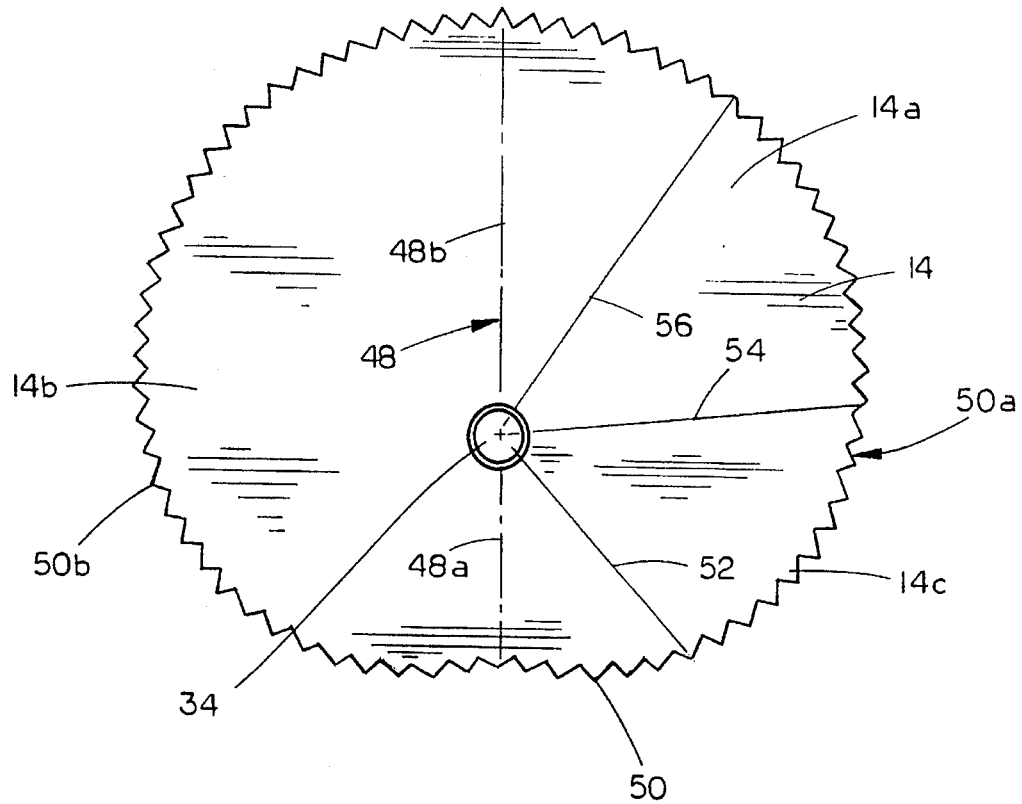
FIG. 3 is an enlarged plan view of the blade of the invention.

Referring now to FIG. 3, blade 14 has been enlarged to show the special configuration utilized in the present invention. A centerline 48 is marked on the blade which extends through the center of shaft 34, and divides blade 14 into halves 14a and 14b, which are mere images taken along centerline 48. Shaft 34 is affixed to blade 14 along centerline 48, and is located off center to divide centerline 48 into a short rearward length 48a and a long forward length 48b. Each tooth 50 along the peripheral edge 14c of blade 14 is located at a radial length from shaft 34 which increases from centerline rearward length 48a to centerline forward length 48b. Thus, the length of radials 52, 54 and 56, shown in FIG. 3, successively increase to a maximum length at centerline forward length 48b, along blade half 14a. A similar increasing radial length from centerline rearward length 48a to centerline forward length 48b occurs on the opposing blade half 14b. Preferably, the perimeter edge 14c of blade 14 spirals uniformly outwardly in each direction from centerline rearward length 48a to centerline forward length 48b. Blade half 14a includes a set of teeth 50a which are oriented so as to cut when blade 14 is rotated in a clockwise direction, while blade half 14b has a set of teeth 50b oriented to cut when blade 14 is rotated in a counterclockwise direction.

Figure 2:
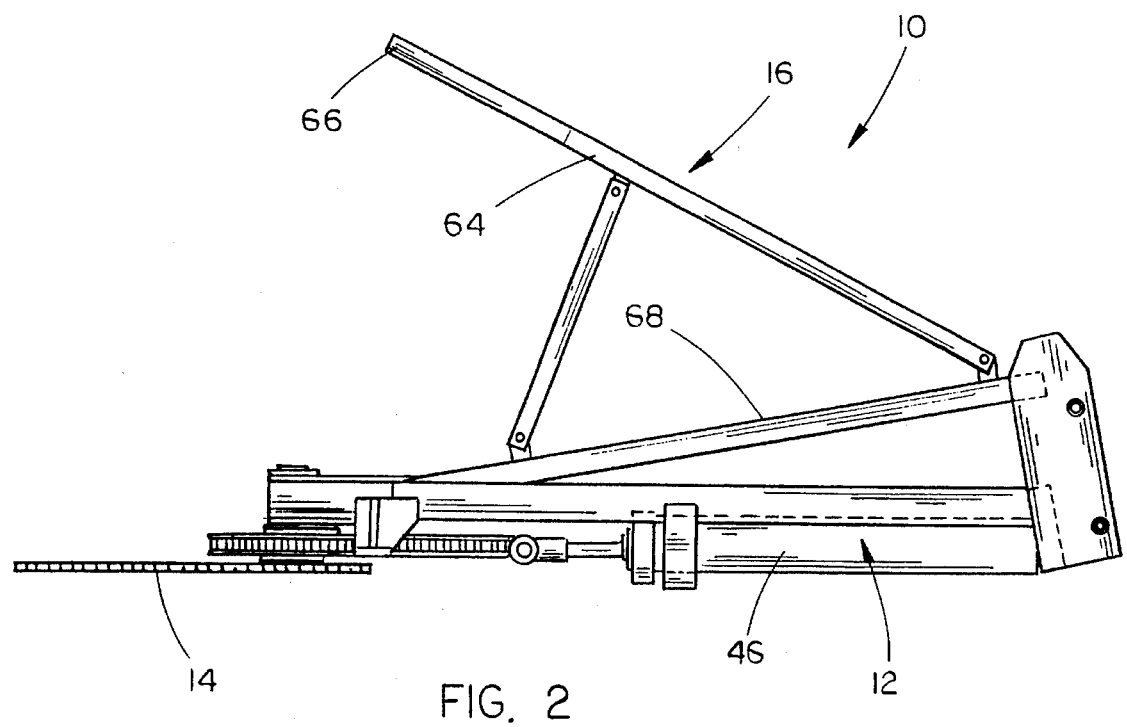
FIG. 2 is a side elevational view of the invention.
Figure 4:
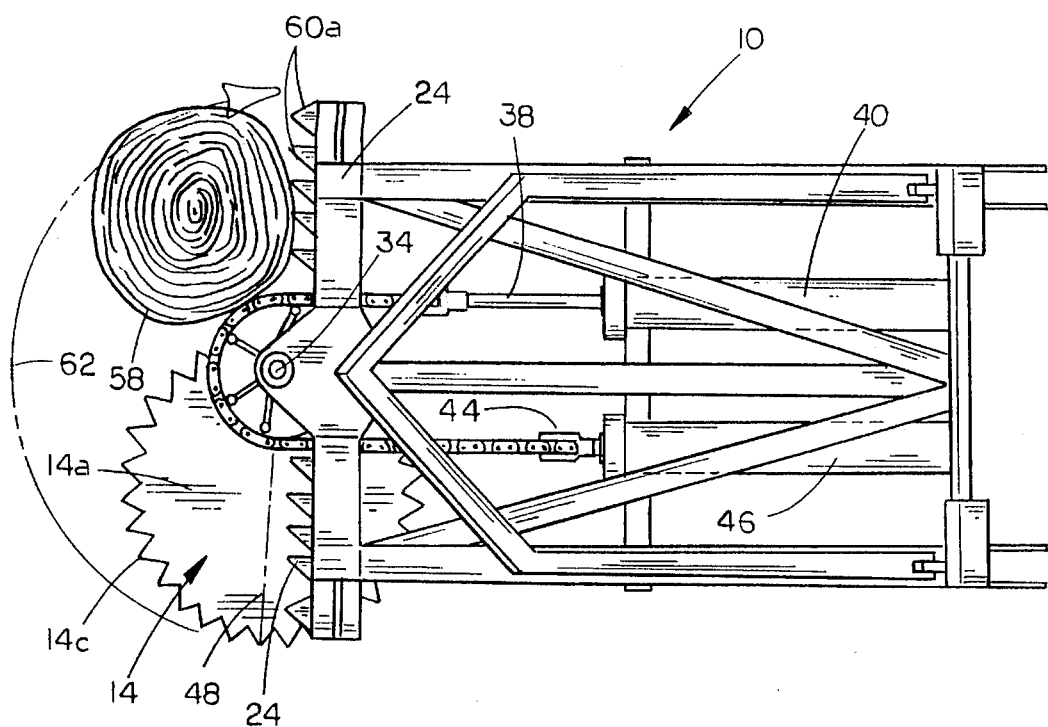
FIG. 4 is a top plan view of the invention with the blade in a first position.
Figure 5:
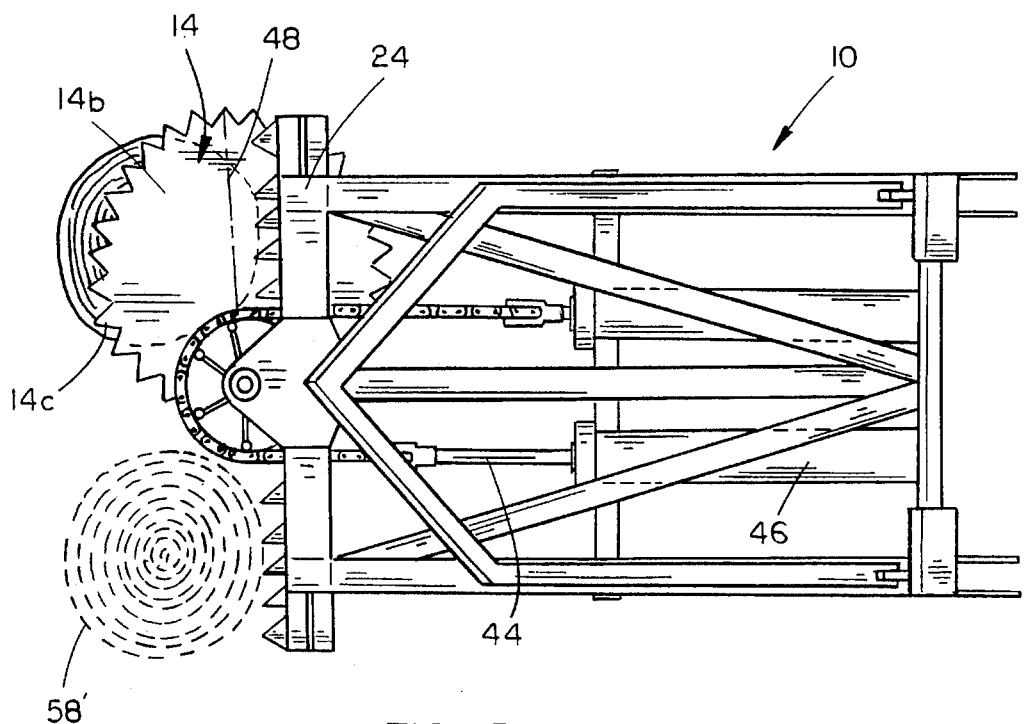
FIG. 5 is a top plan view similar to FIG. 4, but with the blade in a second position.

Referring now to FIGS. 4 and 5, this spiral cutting edge 14c formed on each blade half 14a and 14b serves to create a uniform pressure as blade 14 is rotated to cut a tree 58. A plurality of forwardly projecting teeth 60 formed on the forward edge of forward cross-member 24 serves to hold tree 58 in position during the cutting procedure, as described in more detail hereinbelow. As shown in FIG. 2, blade 14 is preferably mounted in a horizontal plane located below frame 12 and cylinders 40 and 46 so as to be the lowest component of the cutting apparatus 10. In this way, a tree may be cut flush with the ground.

In operation, blade 14 is moved to an initial position by retracting extensible arm 44 with cylinder 46 to move centerline 48 to a position generally parallel with forward cross-member 24. Cutting apparatus 10 is then moved to a position adjacent tree 58 with forward teeth 60a on one-half of cross-member 24 engaging tree 58. Cylinder 40 is then operated to retract extensible arm 38 and thereby rotate blade 14 on shaft 34 as shown by arrow 62. The cutting edge 14c on blade half 14a will engage and cut tree 58 as the cutting edge 14c increases in radial length. The cut is complete once blade half 14a cuts completely through the diameter of tree 58, or centerline 48 reaches a position generally parallel with forward cross-member 24, as shown in FIG. 5. It can then be seen that cutting apparatus 10 is immediately ready for a second cutting operation using blade half 14b for a second tree 58' shown in the broken lines in FIG. 5. The second operation is accomplished by activating cylinder 46 to retract arm 44 and thereby move blade 14 from the second position shown in FIG. 5 to the first position shown in FIG. 4.

Referring once again to FIGS. 1 and 2, the tree deflecting frame 16 is mounted to support frame 12, and serves to deflect a cut tree away from the rearward end of tree cutting apparatus 10. Deflecting frame 16 preferably includes a generally V-shaped member 64 having a forward point 66 which will be located very close to a tree trunk during the cutting of the tree. The V-shape of member 64 serves to deflect movement of a falling tree away from the rearward end of cutting apparatus 10. A series of braces 68 extend from support frame 12 to support deflecting frame 16 at the appropriate orientation.

Whereas the invention has been shown and described in connection with the preferred embodiment thereof, it will be understood that many modifications, substitutions and additions may be made which are within the intended broad scope of the appended claims. For example, a variety of hitching apparatus may be utilized on the rearward end of tree cutting apparatus 10 to permit attachment of the apparatus to a wide variety of vehicles. In addition, various tooth shapes and blade overall shapes may be utilized, so long as the radial length of the cutting edge increases as the blade rotates.

I claim:

1. A dual action tree cutting apparatus, comprising:

a support frame having a forward end, rearward end, and longitudinal sides;

a single, generally planar blade rotatably mounted on a generally vertical shaft on the forward end of said frame, for rotation about the longitudinal axis of said shaft;

said blade having an arcuate cutting edge extending around the entire perimeter thereof, and a centerline mark passing through said shaft dividing the blade into first and second halves, said centerline having forward and rearward ends intersecting the blade perimeter;

said blade cutting edge formed on the perimeter at a length from the shaft which increases from the centerline rearward end to the centerline forward end along each blade half; and drive means on said frame operably connected to said blade for selectively rotating said blade clockwise and counterclockwise on said shaft.

2. The tree cutting apparatus of claim 1, wherein said cutting edge includes a first set of teeth extending around the perimeter of the first blade half and oriented to cut as the blade is rotated clockwise, and a second set of teeth extending around the perimeter of the second blade half and oriented to cut as the blade is rotated counterclockwise.

3. The tree cutting apparatus of claim 1, further comprises gripping means on the forward end of said frame for preventing transverse sliding movement of a tree away from the blade relative to the frame, as the blade is rotated to cut the tree.

\* \* \* \* \*